(12) United States Patent
Li et al.

(10) Patent No.: US 6,414,765 B1
(45) Date of Patent: Jul. 2, 2002

(54) PROTECTION SWITCH IN A TWO-FIBER OPTICAL CHANNEL SHARED PROTECTION RING

(75) Inventors: Ming Li, Horseheads; Mark Soulliere, Corning; Richard Wagner, Painted Post, all of NY (US)

(73) Assignee: Corning, Inc., Corning, NY (US)

( * ) Notice: Subject to any disclaimer, the term of this patent is extended or adjusted under 35 U.S.C. 154(b) by 0 days.

(21) Appl. No.: 09/799,374

(22) Filed: Mar. 5, 2001

Related U.S. Application Data
(60) Provisional application No. 60/187,656, filed on Mar. 7, 2000.

(51) Int. Cl.[7] .................... H04B 10/08; H04B 10/20; H04J 14/00; H04J 14/02
(52) U.S. Cl. ................. 359/110; 359/117; 359/119; 359/125; 359/127; 359/128; 359/124
(58) Field of Search .................. 359/110, 115, 359/117, 118, 119, 124, 125, 127, 128

(56) References Cited

U.S. PATENT DOCUMENTS

| | | | |
|---|---|---|---|
| 5,406,401 A | * 4/1995 | Kremer | 359/110 |
| 5,647,035 A | 7/1997 | Cadeddu et al. | 385/24 |
| 5,680,235 A | 10/1997 | Johansson | 359/110 |
| 5,867,289 A | 2/1999 | Gerstel et al. | 350/110 |
| 5,903,370 A | 5/1999 | Johnson | 359/119 |
| 6,023,359 A | 2/2000 | Asahi | 359/119 |
| 6,115,154 A | * 9/2000 | Antoniades et al. | 359/110 |
| 6,195,186 B1 | * 2/2001 | Asahi | 359/110 |
| 6,222,653 B1 | * 4/2001 | Asahi | 359/110 |
| 6,249,510 B1 | * 6/2001 | Thompson | 370/223 |

* cited by examiner

*Primary Examiner*—Jason Chan
*Assistant Examiner*—M. R. Sedighian
(74) *Attorney, Agent, or Firm*—Wall Marjama & Bilinski LLP

(57) ABSTRACT

A protection switch for use in a two-fiber optical channel shared protection ring is disclosed. It includes an electrical switching circuit coupled to an optical signal monitor. The electrical switching circuit includes modular switching fabrics that respond to fault condition alarms provided by the optical signal monitor. Each modular switching fabric is versatile in that it includes a ring switch mode responsive to the multi-wavelength channel failures, and a span switch mode responsive to the single wavelength channel failures. Because the switching fabric of the electrical switching circuit is comprised of the plurality of small modular switching fabrics, the possibility of incurring a single-point switching failure in the switching fabric is virtually eliminated. Further, each modular switching fabric can be easily replaced in the event of failure, without affecting the operation of other switch fabrics within the protection switch.

35 Claims, 11 Drawing Sheets

PROTECTION SWITCH IN A TWO-FIBER OPTICAL CHANNEL SHARED PROTECTION RING

CROSS-REFERENCE TO RELATED APPLICATIONS

This is a continuation of U.S. Provisional Patent Application Ser. No. 60/187,656 filed on Mar. 7, 2000, the content of which is relied upon and incorporated herein by reference in its entirety, and the benefit of priority under 35 U.S.C. §119(e) is hereby claimed.

BACKGROUND OF THE INVENTION

1. Field of the Invention

The present invention relates generally to single two-fiber optical channel shared protection rings, and particularly to protection switching in single two-fiber optical channel shared protection rings.

2. Technical Background

Optical protection ring topologies are currently being deployed by network providers because of their cost savings, survivability, and ability to self-heal. Ring topologies typically include a plurality of client access nodes that are interconnected by at least two optical fibers to form a ring. Traffic is transmitted from node to node around the ring. Wavelength Add/Drop multiplexers (WADMs) are employed at each node to allow clients to gain access to the ring. Client transmitters are coupled to the add portion of the WADM to insert client traffic onto the ring, whereas client receivers are coupled to the drop portion of the WADM to receive ring traffic.

Optical protection rings can survive and self-heal from ring fault conditions by providing duplicate and geographically diverse paths for all of the client traffic propagating on the ring. In a two-fiber ring, this is accomplished by providing two fibers that carry traffic in opposite directions. In addition, each fiber reserves approximately half of its bandwidth 30 for protection purposes. Thus, if a cable is cut between two nodes, or a wavelength channel transmitter becomes disabled at a particular node, or if there is a switch fabric failure, the ring will detect the fault condition, and route traffic around the damaged network component using the reserved protection bandwidth until a repair can be effected.

The protection switching used to implement the self-healing features of the ring is resident in each node. However, conventional protection switches have several shortcomings.

First, most protection switches are not versatile enough to provide protection for both multi-channel failures and single channel failures. Second, most protection switches employ large switching fabrics. Thus, if the switching fabric itself experiences a failure, a single point failure severely impacting the operation of the entire ring may result. Thus, what is needed is a protection switch that includes small modular switching fabrics to substantially reduce the possibility of single-point failures. Further, a protection switch is needed that will provide protection for both multi-channel failures and single channel failures.

SUMMARY OF THE INVENTION

The present invention includes a protection switch having a plurality of small modular switching fabrics that substantially reduce the possibility of single-point failures. Each modular switch fabric can be easily replaced without affecting other operational portions of the protection switch. The protection switch of the present invention provides protection for both multi-channel failures and single channel failures.

One aspect of the present invention is a protection switch in a node of a two-fiber optical channel shared protection ring. The node includes a plurality of primary clients and a plurality of pre-emptible clients. Each fiber in the two-fiber optical channel shared protection ring propagates at least one working wavelength channel dedicated to primary client traffic and at least one protection wavelength channel which may accommodate extra client traffic. The protection switch includes an optical signal monitor coupled to the two-fiber optical channel shared protection ring. The optical signal monitor is operative to detect multi-wavelength channel failures and single wavelength channel failures in the two-fiber optical channel shared protection ring. An electrical switching circuit is coupled to the optical signal monitor. The electrical switching circuit includes a plurality of modular switching fabrics. Each modular switching fabric of the plurality of modular switching fabrics includes a ring switch mode that is responsive to the multi-wavelength channel failures, and a span switch mode that is responsive to the single wavelength channel failures.

In another aspect, the present invention includes a modular switching fabric for use in a protection switch resident in a node of a two-fiber optical channel shared protection ring. Each node includes a plurality of primary clients and a plurality of pre-emptible clients. Each fiber of the two fibers propagates at least one working wavelength channel dedicated to primary client traffic and at least one protection wavelength channel which may accommodate extra client traffic. The protection switch includes a first 3×1 switch coupled to a first primary client receiver. A first 2×1 switch is coupled to a first extra client receiver.

A second 3×1 switch is coupled to a second primary client receiver. A second 2×1 switch is coupled to a second extra client receiver. A controller is coupled to the first 3×1 switch, the second 3×1 switch, the first 2×1 switch, and the second 2×1 switch. The controller is operative to actuate the switches in order to receive the primary client's receive signal from a protection wavelength propagating on the first fiber instead of a working wavelength channel propagating on the second fiber, and pre-empt extra client traffic, in response to a multi-wavelength channel failure.

In yet another aspect, the present invention includes a two-fiber optical channel shared protection ring for bi-directional communications between a plurality of nodes. Each node includes a plurality of primary clients and a plurality of pre-emptible clients. Each fiber of the two fibers propagates at least one working wavelength channel dedicated to primary client traffic and at least one protection wavelength channel which may accommodate extra client traffic. The protection switch includes a first 3×1 switch having inputs coupled to a first primary client transmitter, a first extra client transmitter, and a second primary client transmitter. A first 2×1 switch has an input coupled to the first extra client transmitter and an output connected to the first 3×1 switch. A second 3×1 switch has inputs coupled to a first primary client transmitter, a second extra client transmitter, and a second primary client transmitter. A second 2×1 switch has an input coupled to the second extra client transmitter and an output connected to the second 3×1 switch. A controller is coupled to the first 3×1 switch, the second 3×1 switch, the first 2×1 switch, and the second 2×1 switch. The controller is operative to actuate the switches in order to switch a primary client's transmission signal from a working wavelength propagating on a first fiber of the two fibers to a protection wavelength propagating on a second fiber of the two fibers in response to a multi-wavelength channel failure.

In yet another aspect, the present invention includes a method for switching bi-directional traffic between a plurality of nodes in a two-fiber optical channel shared protection ring. Each node includes a plurality of primary clients and a plurality of pre-emptible clients. Each fiber of the two fibers propagates at least one working wavelength channel dedicated to primary client traffic and at least one protection wavelength channel which may accommodate extra client traffic. The method includes providing a protection switch in each node of the plurality of nodes. Each protection switch is coupled to the two fibers, the plurality of primary clients, and the plurality of pre-emptible clients. The protection switch includes a plurality of modular switching fabrics. A fault condition is detected in the two-fiber optical channel shared protection ring. At least one of the modular switching fabrics is actuated in response to the step of detecting, whereby a primary client's transmission signal is switched from a working wavelength propagating on a first fiber of the two fibers to a protection wavelength propagating on a second fiber of the two fibers. The primary client's receive signal is switched from a working wavelength propagating on the second fiber to a protection wavelength propagating on the first fiber. Extra client traffic is preempted.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
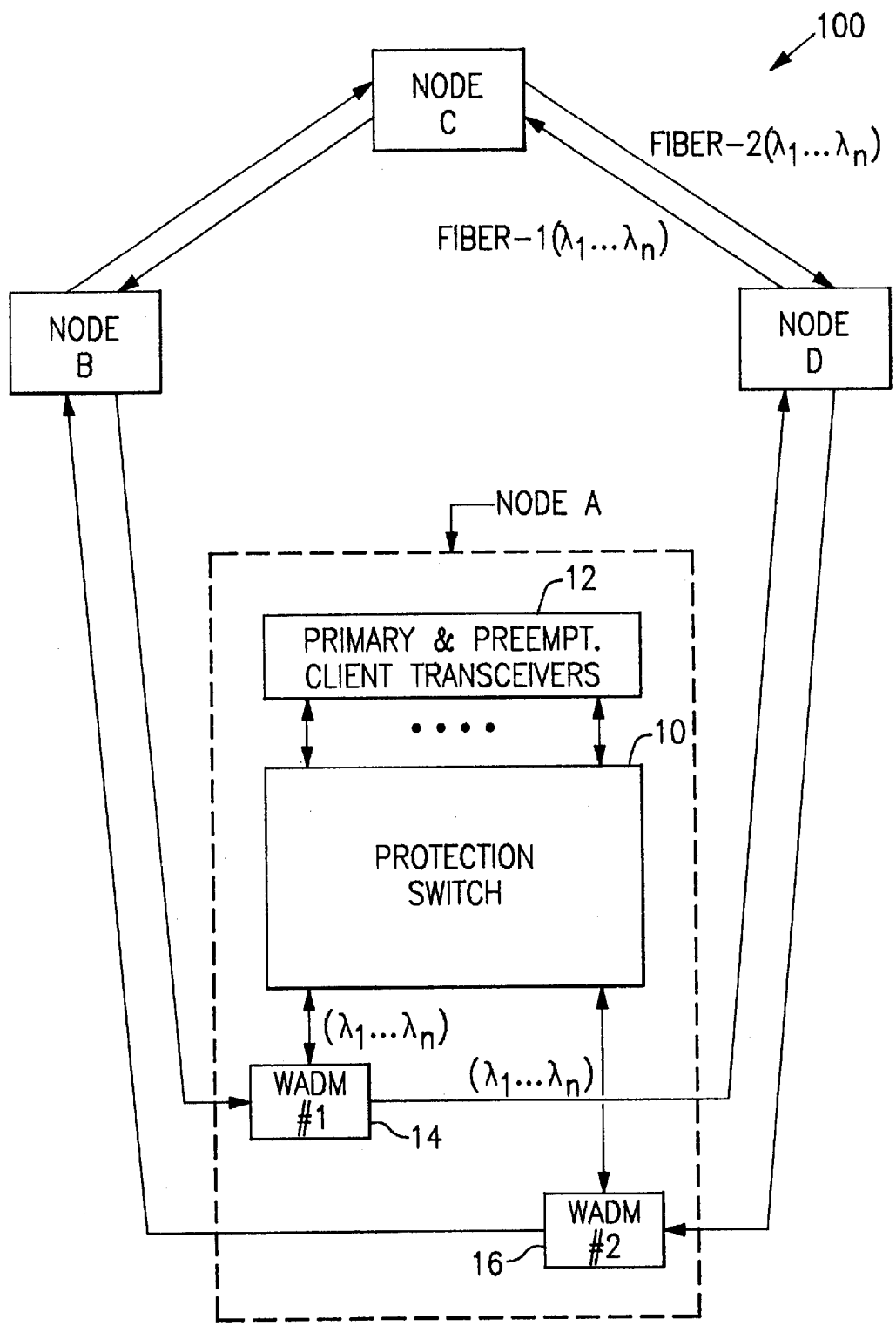
FIG. 1 is a block diagram of a two-fiber optical channel shared protection ring including a protection switch according to the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the protection switch of the present invention is shown in FIG. 1, and is designated generally throughout by reference numeral 10.

In accordance with the invention, the present invention for a protection switch includes an electrical switching circuit coupled to an optical signal monitor. The electrical switching circuit includes a plurality of modular switching fabrics that respond to fault condition alarms provided by the optical signal monitor. Each modular switching fabric is versatile in that it includes a ring switch mode that is responsive to the multi-wavelength channel failures, and a span switch mode that is responsive to the single wavelength channel failures. Because the switching fabric of the electrical switching circuit is comprised of the plurality of small modular switching fabrics, the possibility of incurring a single-point switching failure in the switching fabric is virtually eliminated.

As embodied herein, and depicted in FIG. 1, a block diagram of two-fiber optical channel shared protection ring 100 including protection switch 10 according to the present invention is disclosed. Shared protection ring 100 may include any number of nodes, but there is shown by way of example, node A, node B, node C, and node D interconnected by fiber 1 and fiber 2. Fiber 1 propagates working wavelengths $\lambda_1, \lambda_3, \ldots \lambda_M$, and protection wavelengths $\lambda_2, \lambda_4, \ldots \lambda_N$ in a counter-clockwise direction. Fiber 2 propagates working wavelengths $\lambda_2, \lambda_4, \ldots \lambda_N$, and $\lambda_1, \lambda_3, \ldots \lambda_m$, and protection wavelengths $\lambda_1, \lambda_3, \ldots \lambda_M$ in a clockwise direction. Node A, for example includes primary client and pre-emptible extra client transceivers 12. Client transceivers 12 are coupled to protection switch 10. Protection switch 10 is coupled to fiber 1 via WADM 14, and fiber 2 via WADM 16. Thus, wavelength channels are transmitted by protection switch 10 and added to fiber traffic flow by the WADM's add functionality. Wavelength channels are removed from the fiber traffic flow and transmitted to protection switch 10 using the WADM's drop functionality. Primary traffic is carried around the ring using the working wavelength channels. Extra traffic may be carried around the ring using the protection wavelength channels. However, when a fault condition is detected, extra traffic is pre-empted by protection switch 10 and the protection wavelengths are used to carry primary traffic until the fault condition has been remedied.

Figure 2A:
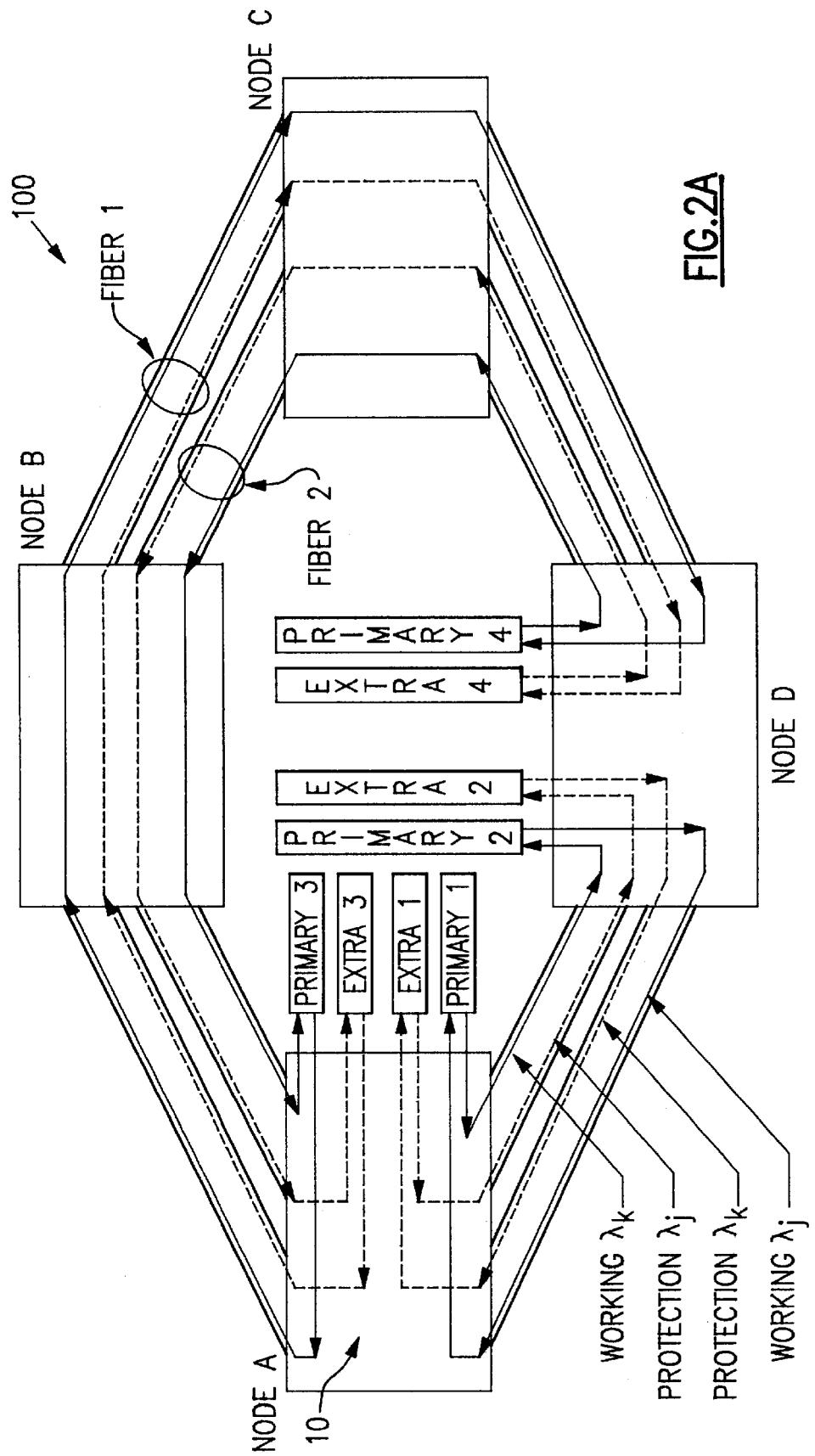
FIG. 2A is a diagrammatic depiction of the two-fiber protection ring under normal operating conditions.

As embodied herein and depicted in FIG. 2A, a block diagram of two-fiber protection ring 100 operating under normal conditions is disclosed. In this example, protection switch 10 in Node A is configured such that primary client 1 transmits to primary client 2 using wavelength channel $\lambda_k$ which is propagating in a counter-clock wise direction in fiber 2. Primary client 1 receives information from primary client 2 using wavelength channel $\lambda_j$ which is propagating in a clock wise direction in fiber 1. Extra client 1 transmits to extra client 2 using protection wavelength channel $\lambda_j$ which is propagating in a counter-clock wise direction in fiber 2. Extra client 1 receives information from extra client 2 using protection wavelength channel $\lambda_k$ which is propagating in a clock wise direction in fiber 1. Primary client 3 and Extra client 3 communicate with Primary client 4 and Extra client 4, respectively, in a similar manner.

Figure 2B:
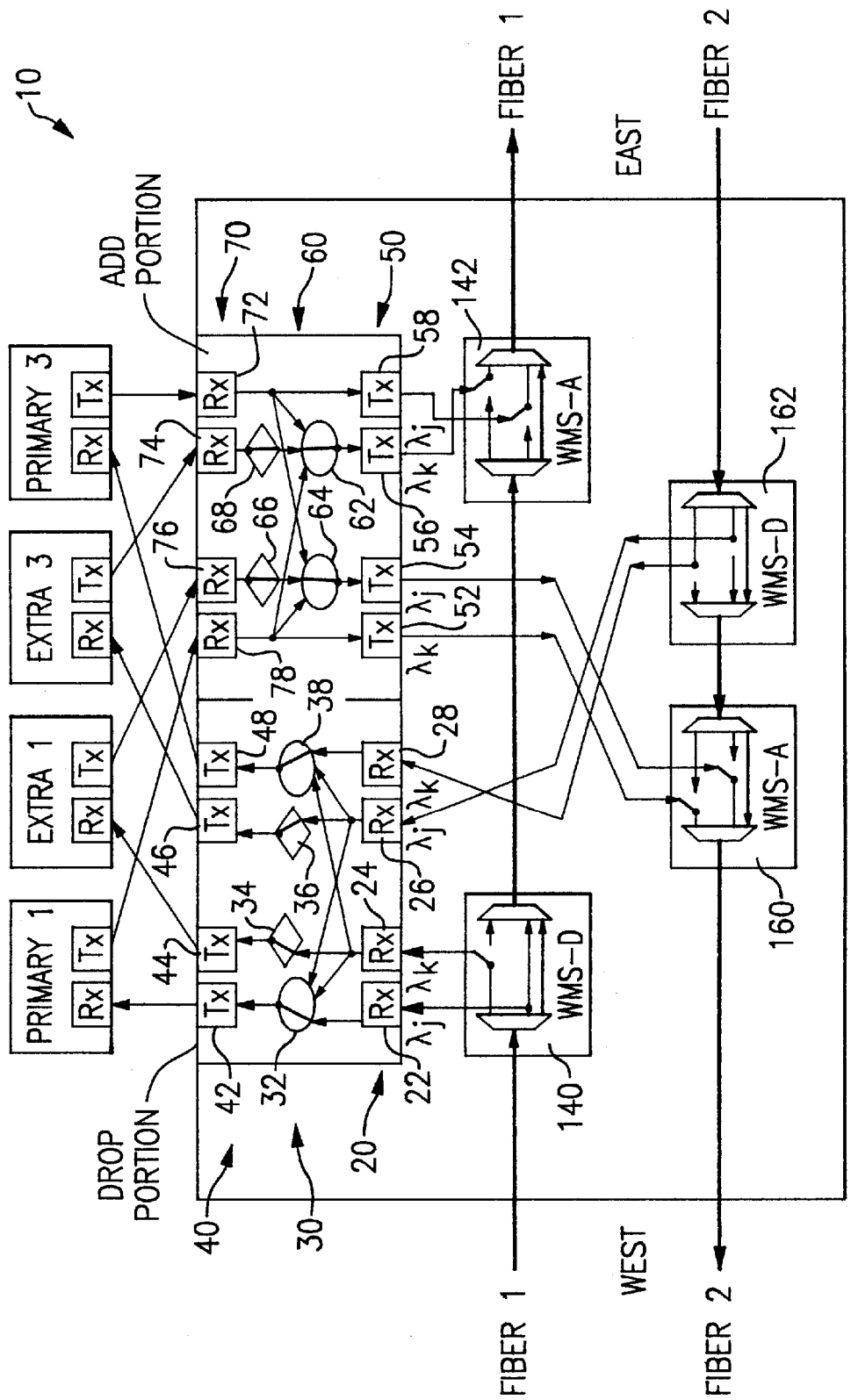
FIG. 2B is a diagrammatic depiction of a modular switch fabric included in the protection switch shown in FIG. 2A.

As embodied herein and depicted in FIG. 2B, a detailed diagram of protection switch 10 as depicted in FIG. 2A is disclosed. For clarity of illustration, WADM 14 is depicted functionally as drop multiplexer 140 and add multiplexer 142. Similarly, WADM 16 is depicted functionally as drop multiplexer 160 and add multiplexer 162. As shown in FIG. 2B, protection switch 10 includes a drop portion and an add portion. The drop portion includes optoelectric converters 20 which are coupled to drop multiplexers 140 and 162. Optoelectric converters 20 are coupled to switch fabric 30. Switch fabric 30 is coupled to electrooptical converters 40. Electrooptical converters 40 transmit data to primary client 1, primary client 3, extra client 1, and extra client 3 using 1310 nm short reach optics. The add portion of protection switch 10 includes optoelectric converters 70 which receive data from primary client 1, primary client 3, extra client 1, and extra client 3 using 1310 nm short reach optics. Optoelectric converters 70 are coupled to switch fabric 60. Switch fabric 60 is coupled to electrooptical converters 50. Electrooptical converters 50 are coupled to add multiplexers 142 and 160. Protection switch 10 operates as follows under normal operating conditions.

Optoelectric converter 22 converts working wavelength channel $\lambda_j$, which was dropped by drop multiplexer 140, into a data signal. The data signal is then provided to 3×1 switch 32. 3×1 switch 32 also receives inputs from optoelectric converter 24 and optoelectric converter 26. In the normal operational switch state, 3×1 switch 32 selects data from optoelectric converter 22, and provides the data to electrooptic converter 42. The data is subsequently transmitted to primary client receiver 1.

Optoelectric converter 24 converts protection wavelength channel $\lambda_k$, which was also dropped by drop multiplexer 140, into another data signal. This data signal is provided to 2×1 switch 34. Electrooptic converter 44 receives the data signal and transmits it to the extra client receiver 1.

Optoelectric converter 26 converts protection wavelength channel $\lambda_j$, which was dropped by drop multiplexer 162, into a third data signal. This data signal is provided to 2×1 switch 36. Electrooptic converter 46 receives the data signal and transmits it to the extra client receiver 3.

Optoelectric converter 28 converts working wavelength channel $\lambda_k$, which was also dropped by drop multiplexer 162, into a fourth data signal. The data signal is then provided to 3×1 switch 38. 3×1 switch 32 also receives inputs from optoelectric converter 24 and optoelectric converter 26. In the normal operational switch state, 3×1 switch 38 selects data from optoelectric converter 28, and provides the data to electrooptic converter 48. The data is subsequently transmitted to primary client receiver 3. The add portion of protection switch 10 operates as follows.

Optoelectric converter 72 converts 1310 nm light into a working data signal. The working data signal is then provided to electrooptic converter 58, 3×1 switch 62, and 3×1 switch 64. Electrooptic converter 58 transmits the working data to add multiplexer 142 on working wavelength channel $\lambda_j$. 3×1 switch 62 also receives inputs from optoelectric converter 78 and 2×1 switch 68. In the normal operational switch state, 3×1 switch 62 selects data from 2×1 switch 68, and provides the data to electrooptic converter 56. This data originated from extra transmitter 3. Thus, the data is transmitted to add multiplexer 142 on protection wavelength channel $\lambda_k$.

Optoelectric converter 78 converts 1310 nm light into a second working data signal. The second working data signal is then provided to electrooptic converter 52, 3×1 switch 62, and 3×1 switch 64. Electrooptic converter 52 transmits the working data to add multiplexer 160 on working wavelength channel $\lambda_k$. 3×1 switch 64 also receives inputs from optoelectric converter 72 and 2×1 switch 66. In the normal operational switch state, 3×1 switch 64 selects data from 2×1 switch 66, and provides the data to electrooptic converter 54. This data originated from extra transmitter 1. Thus, the data is transmitted to add multiplexer 160 on protection wavelength channel $\lambda_j$.

EXAMPLES

The invention will be further clarified by the following examples which are intended to be exemplary of the invention.

Example 1

Figure 3A:
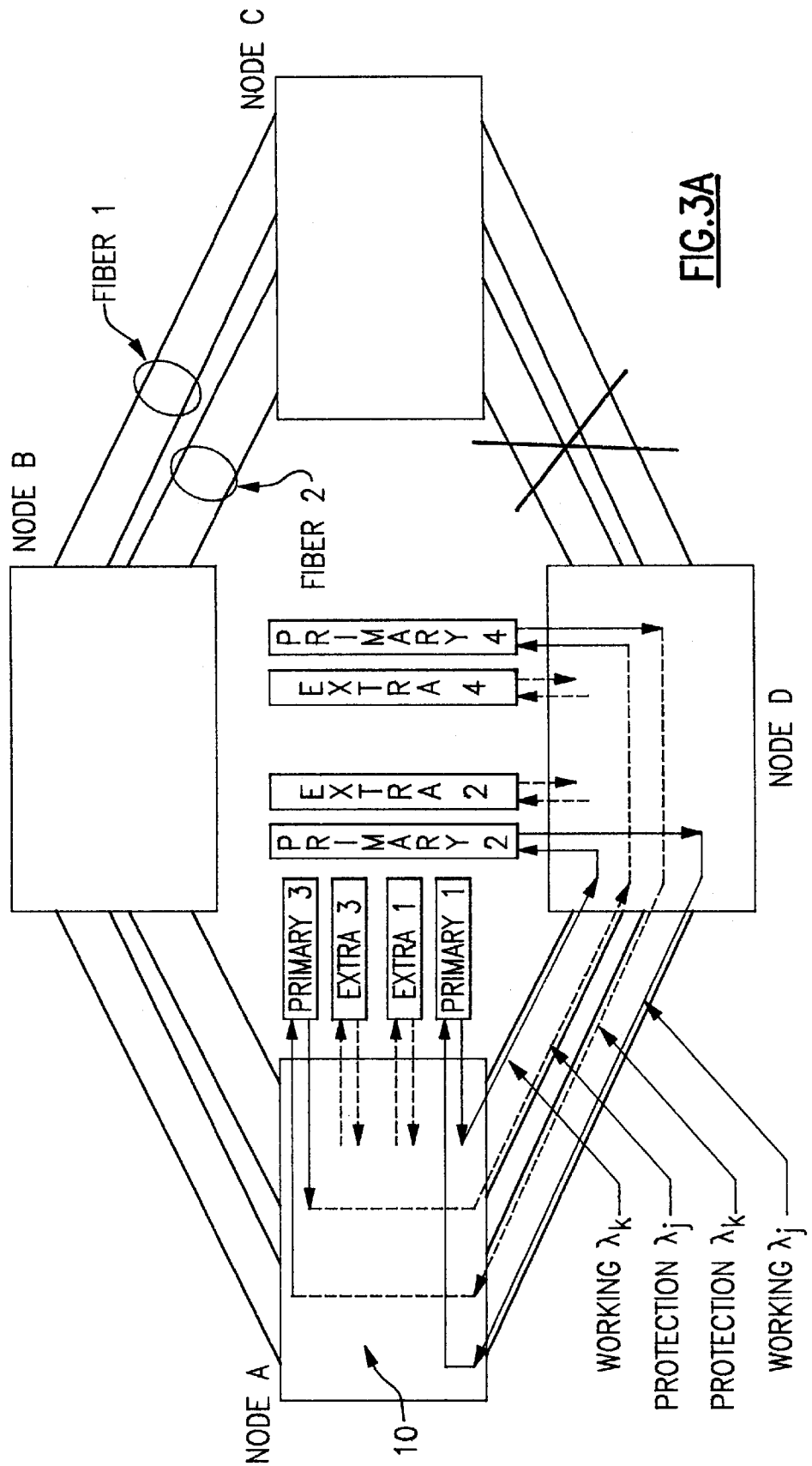
FIG. 3A is an example of the two-fiber protection ring operating under a multi-channel fault condition.

As embodied herein and depicted in FIG. 3A, an example of the two-fiber protection ring operating under a multi-channel fault condition is disclosed. The multi-channel fault condition depicted in FIG. 3A is a cable cut. Both fiber 1 and fiber 2 are severed between Node C and Node D. To compensate, protection switch 10 pre-empts extra client 1 and extra client 3. Primary client 1 transmits to primary client 2 over channel $\lambda_k$ on fiber 2. Primary client 2 transmits to primary client 1 over channel $\lambda_j$ on fiber 1. Primary client 3 transmits to primary client 4 over protection channel $\lambda_j$ on fiber 2. Primary client 4 transmits to primary client 3 over protection channel $\lambda_k$ on fiber 1.

Figure 3B:
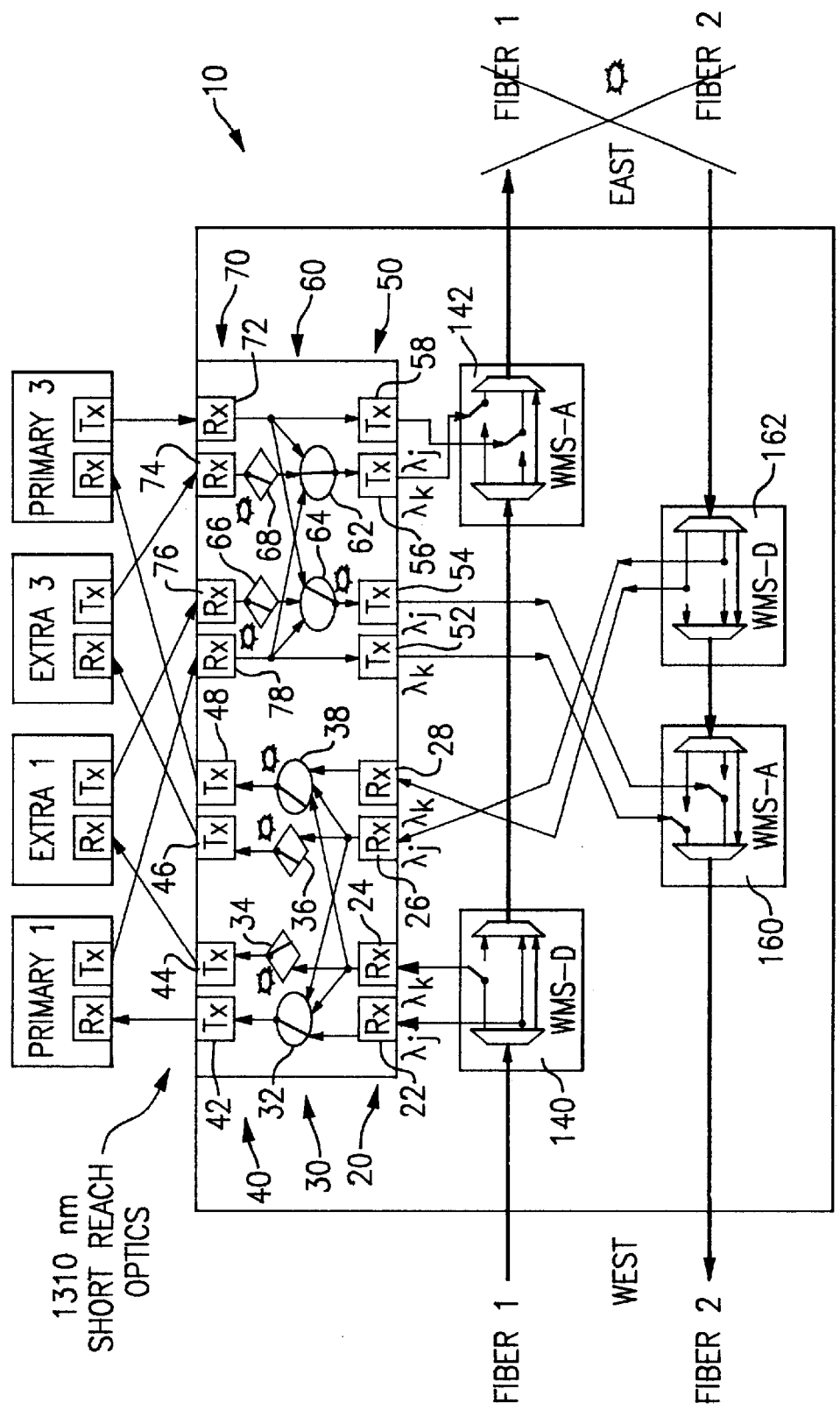
FIG. 3B is an operational example of the modular switch fabric responding to the multi-channel fault condition shown in FIG. 3A.

FIG. 3B is an operational example of the modular switch fabric responding to the multi-channel fault condition shown in FIG. 3A. In the drop portion of protection switch 10, 2×1 switch 34 and 2×1 switch 36 are both actuated to an off-state to thereby pre-empt extra receiver 1 and extra receiver 3, respectively. In addition, 3×1 switch 38 is actuated to select data from optoelectric converter 24. Thus, working data that is carried by protection wavelength channel $\lambda_k$ on fiber 1, is routed to primary receiver 3. In the add portion of protection switch 10, 2×1 switch 66 and 2×1 switch 68 are both actuated to an off-state to thereby pre-empt extra transmitter 1 and extra transmitter 3, respectively. Further, 3×1 switch 64 is actuated to select data from optoelectric converter 72. Thus, working data provided by primary transmitter 3 is carried by protection wavelength channel $\lambda_j$ on fiber 2.

Example 2

Figure 4A:
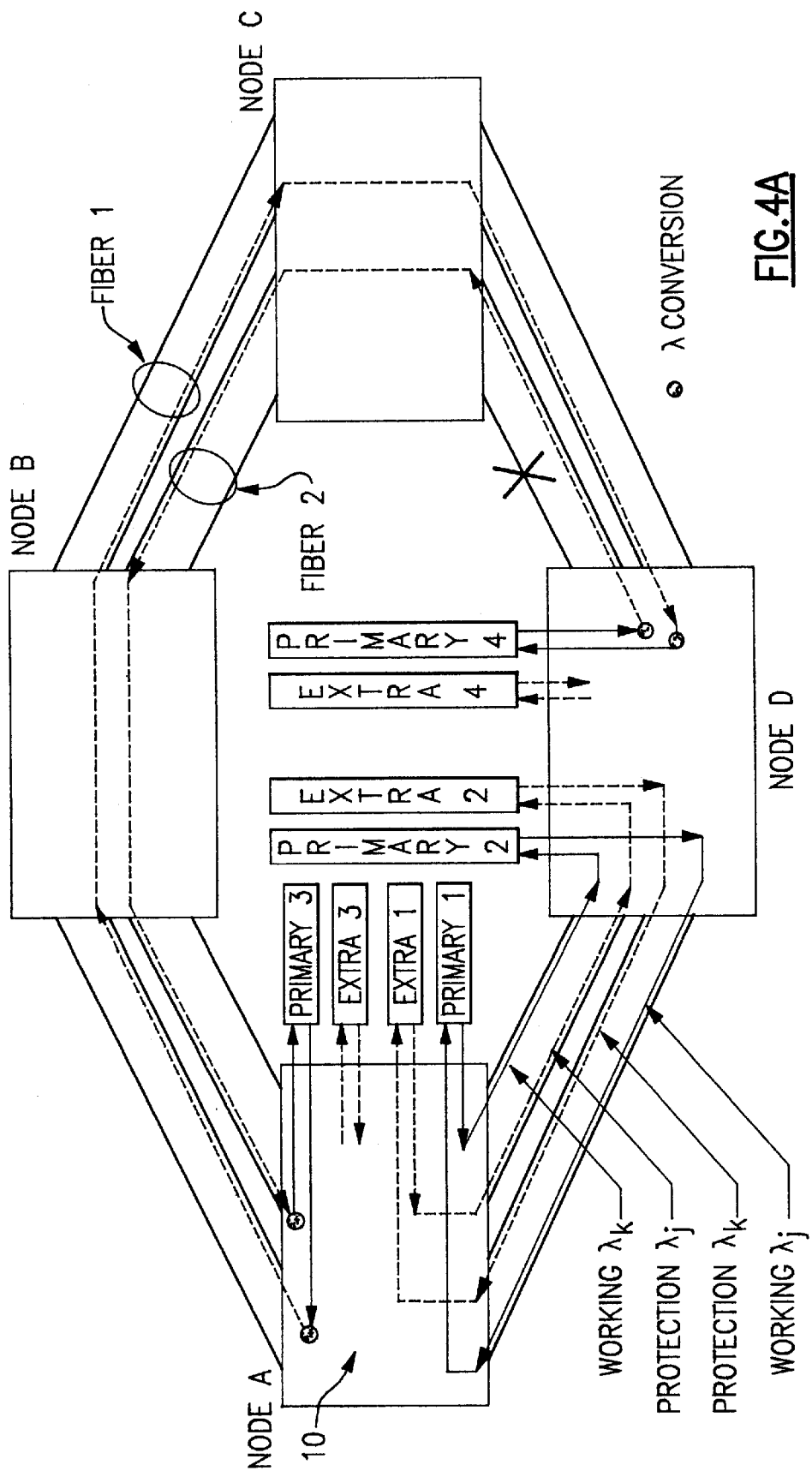
FIG. 4A is an example of the two-fiber protection ring operating under a single-channel fault condition.

As embodied herein and depicted FIG. 4A, an example of the two-fiber protection ring operating under a single-channel fault condition is disclosed. The single-channel fault depicted in FIG. 4A is an inoperative wavelength channel $\lambda_k$ on fiber 2 between Node C and Node D. This may occur for any number of reasons, including for example, a faulty optical transmitter. To compensate, protection switch 10 only pre-empts extra client 3. Primary client 3 transmits to primary client 4 over protection channel $\lambda_k$ on fiber 1. Primary client 4 transmits to primary client 3 over protection channel $\lambda_j$ on fiber 2.

Figure 4B:
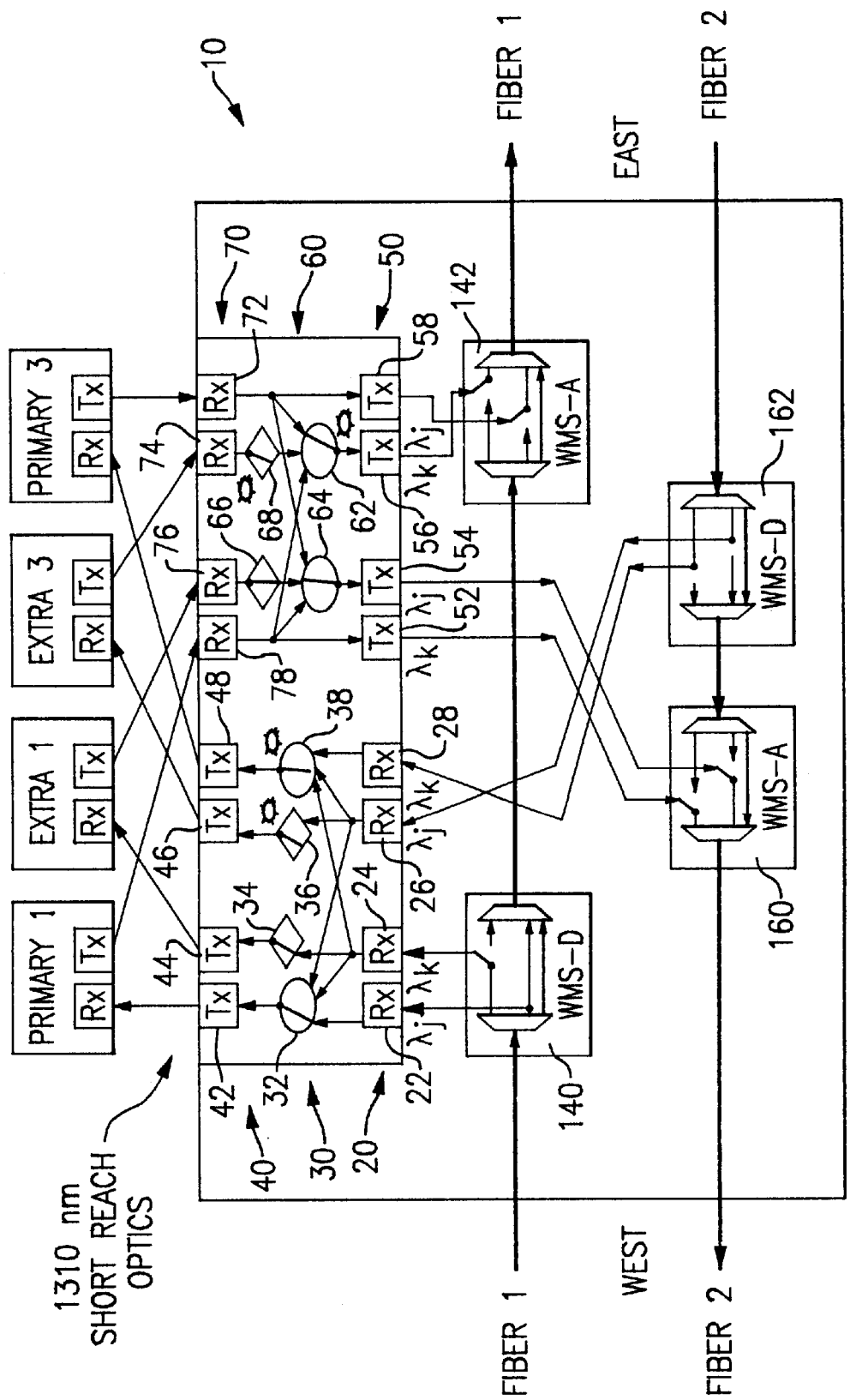
FIG. 4B is an operational example of the modular switch fabric responding to the single-channel fault condition shown in FIG. 4A.

FIG. 4B is an operational example of the modular switch fabric responding to the single-channel fault condition shown in FIG. 4A. In the drop portion of protection switch 10, 2×1 switch 36 is actuated to an off-state to thereby pre-empt extra receiver 3. 3×1 switch 38 is actuated to select data from optoelectric converter 26. Thus, working data that is carried by protection wavelength channel $\lambda_j$ on fiber 2, is routed to primary receiver 3. In the add portion of protection switch 10, 2×1 switch 68 is actuated to an off-state to thereby pre-empt extra transmitter 3. 3×1 switch 62 is actuated to select data from optoelectric converter 72. The working data is changed to an optical signal by electrooptic converter 56 transmitted to add multiplexer 142 on channel $\lambda_k$. Thus, protection wavelength channel $\lambda_k$ carries working data from primary client 3 on fiber 1.

Figure 5:
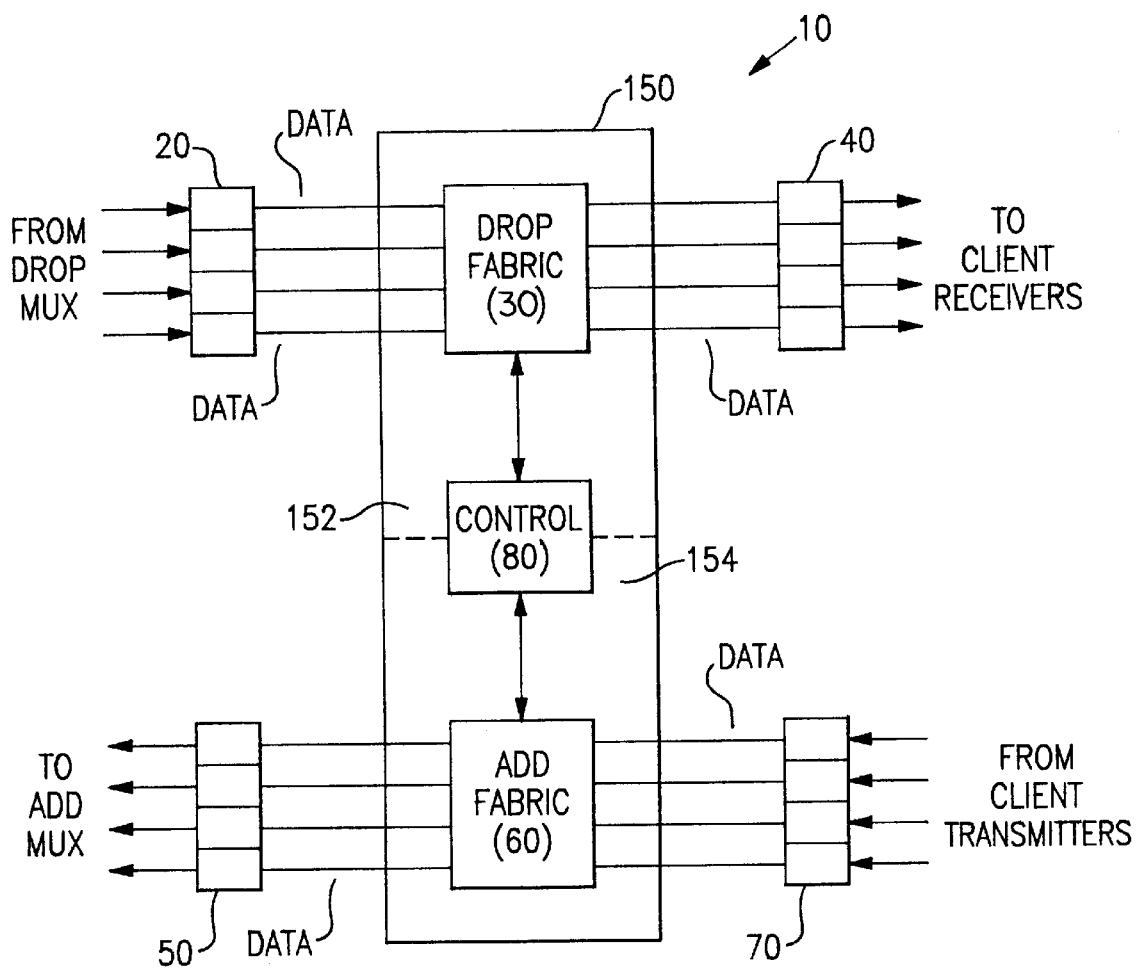
FIG. 5 is a diagrammatic depiction of the modular switching fabric in accordance with an embodiment of the present invention.

As embodied herein and depicted in FIG. 5, a diagrammatic depiction of the modular switching fabric in accordance with an embodiment of the present invention is disclosed. It will be apparent to those of ordinary skill in the pertinent art that the modular switch fabric may be of any suitable type depending on cost and other design considerations, but there is shown by way of example an application specific integrated chip (ASIC) 150 that includes drop switch fabric 30, controller 80, and add fabric 60. In this embodiment, optoelectric converter module is disposed between drop multiplexer 140 and 162, and modular switch fabric 150. Electrooptic converter module 50 is disposed between add multiplexers 142 and 160, and modular switch fabric 150. Optoelectric converter module 70 is disposed between the client transmitters and modular switch fabric 150. Electrooptic converter module 40 is disposed between the client receivers and modular switch fabric 150. Modular switch fabric 150 is programmed to accommodate two working wavelength channels and two protection wavelength channels. Thus, scalability and modularity are provided by adding an ASIC for each set of two working wavelength channels and two protection wavelength channels supported on the protection ring.

Figure 6:
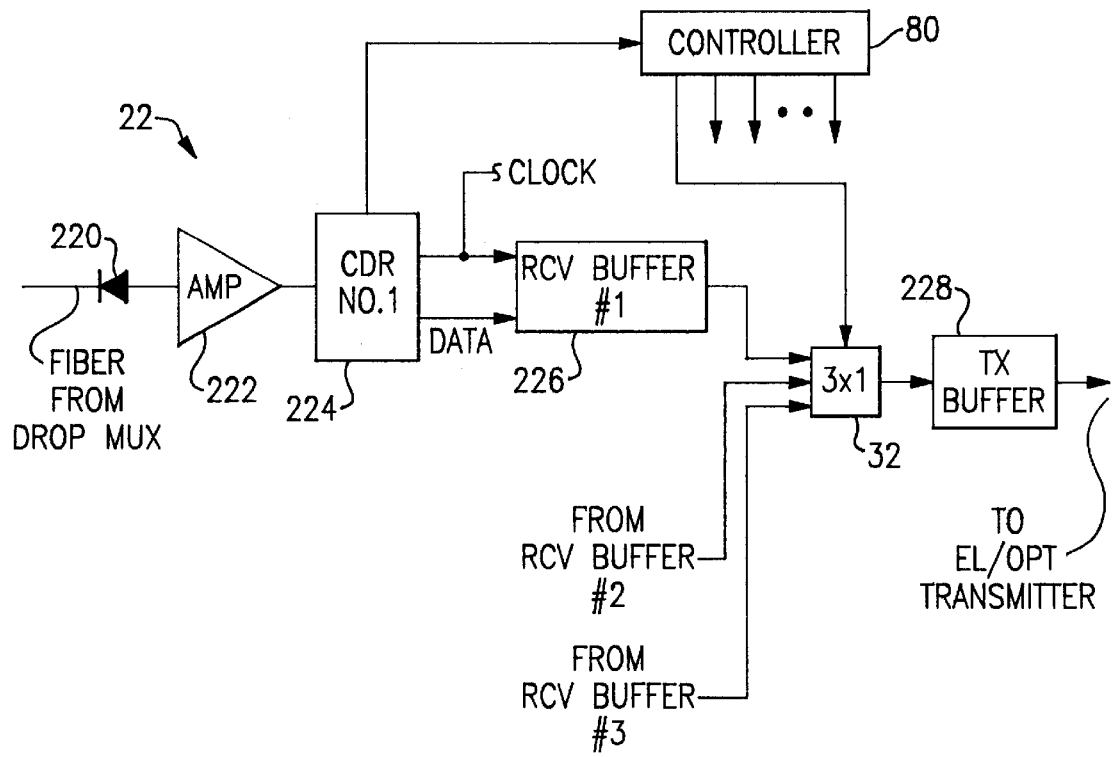
FIG. 6 is a detail view of an optoelectric converter in accordance with an embodiment of the present invention.

FIG. 6 is a detail view of optoelectric converter 22 according to an embodiment of the present invention. It will be apparent to those of ordinary skill in the pertinent art that optoelectric converters 22, 24, 26, and 28 may be of any suitable type as long as they conform to ITU standards. The 1550 nm signal from WADM 14 is converted into an electrical signal current by photodiode 220. Photodiode 220 may be either a PIN diode or an avalanche photodiode. Photodiode 220 is connected to amplifier 222. In one embodiment, amplifier 222 is implemented by providing a transimpedence amplifier in series with a limiting amplifier. The transimpedence amplifier converts the signal current provided by diode 220 into a voltage signal. A transimpedence amplifier typically provides an output signal having a range of several millivolts. The limiting amplifier provides an output signal having an output voltage that is compatible with downstream components. A clock and data recovery circuit (CDR) 224 is connected to amplifier 222. CDR 224 performs timing and amplitude-level decisions on the incoming data. CDR 224 also must comply with ITU standards related to jitter and other signal characteristics. The recovered data is written into receive buffer 226. Receive buffer 226 is connected to 3×1 switch 32. 3×1 switch 32 is connected to an output buffer 228. The data stored in buffer 228 is converted into a 1310 optical signal by electrooptic converter 42. CDR 224 is also coupled to controller 80. In this embodiment, CDR 224 includes a power monitor which is provided to controller 80. If the incoming signal falls below a certain level, a single-channel fault condition is detected. Controller 80 is coupled to the CDRs in all of the optoelectric converters. Thus, if a fault condition is detected in a plurality of converters, controller 80 will interpret this as a multi-channel fault condition and respond accordingly. One of ordinary skill in the art will recognize that other types of ring monitoring may be employed. Optoelectric converters 72, 74, 76, and 78 may be of similar design, adapted to 1310 nm portion of the spectrum.

Figure 7:
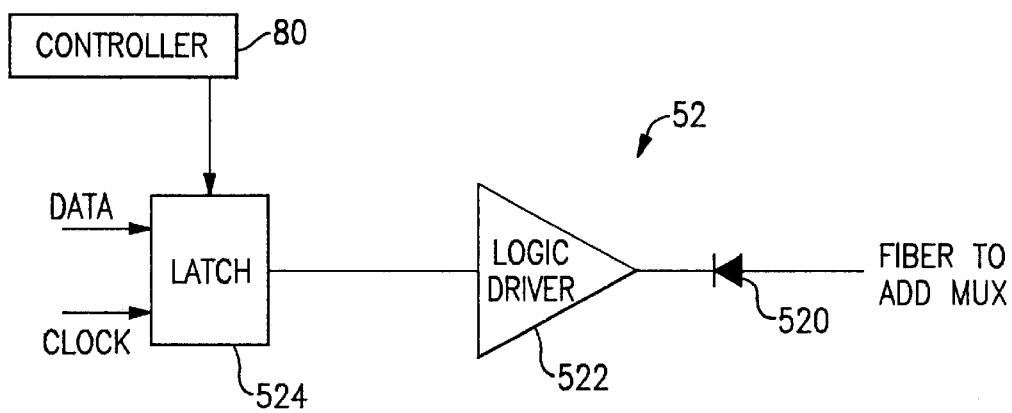
FIG. 7 is a detail view of an electrooptic converter in accordance with an embodiment of the present invention.

FIG. 7 is a detail view of electrooptic converter 52 in accordance with the present invention. Electrooptic converters 52, 54, 56, and 58 may be of any suitable type as long as they conform to ITU standards. Converter 52 includes latch buffer 524 which is coupled to optoelectric converter 78(not shown) to thereby receive data from primary client 1. Latch 524 provides a serial stream of data to laser driver 522, when enabled by controller 80. Laser driver 522 provides laser diode 520 with a DC bias current and a modulation current for signal transmission. The DC bias current is used to set a DC operating point, which is dependent on the type of laser diode used in converter 52. Feedback (not shown) may be used to adjust the DC operating point to compensate for laser drift due to the effects of aging and temperature.

Figure 8:
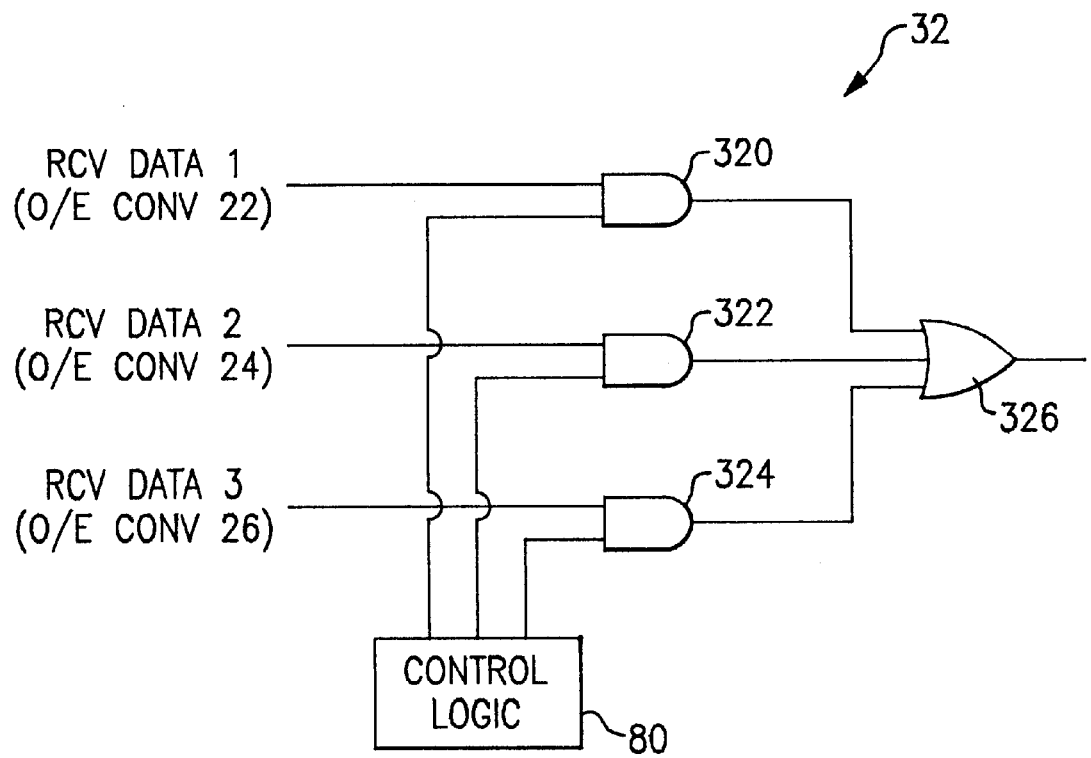
FIG. 8 is an example of a 3×1 switch in accordance with an embodiment of the present invention.

FIG. 8 is an example of a 3×1 switch in accordance with an embodiment of the present invention. In this example 3×1 switch 32 receives data from optoelectric converters 22, 24, and 26. Switch fabric 32 includes AND gates 320, 322, and 324. When controller 80 enables AND gate 320 with a logic one input, data from converter 22 is selected. When controller 80 selects one of the AND gates, the other gates in the 3×1 fabric are provided with a logic zero input to thereby disable the gate. The outputs of AND gates 320, 322, and 324 are inputs to OR gate 326. The output of OR gate 326 is the output of the 3×1 switch. The embodiment of the 3×1 switch depicted in FIG. 8 is easily implemented in ASIC 150. However, one of ordinary skill in the art will recognize that the switch fabric, and the 3×1 switches comprising the switch fabric, can be implemented using other techniques employing semiconductor gated technology.

Figure 9:
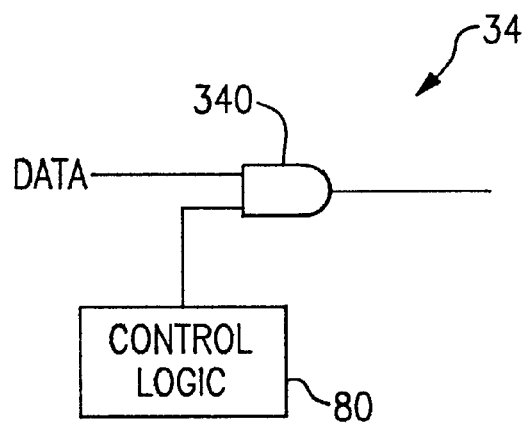
FIG. 9 is an example of a 2×1 switch in accordance with an embodiment of the present invention.

FIG. 9 is an example of a 2×1 switch in accordance with an embodiment of the present invention. 2×1 switches 34, 36, 66, and 68 are coupled to the extra clients and operate on an on-off basis. Thus, 2×1 switches 34, 36, 66, and 68 are easily implemented using AND gate 340. When controller 80 provides AND gate 340 with a logic one signal, AND gate 340 is enabled and transmits the inputted data. When controller 80 provides AND gate 340 with a logic zero signal, AND gate 340 is turned off, and no data will propagate from the 2×1 switch. The embodiment of the 2×1 switch depicted in FIG. 9 is easily implemented in ASIC 150. Again, one of ordinary skill in the art will recognize that the switch fabric, and the 2×1 switches comprising the switch fabric, can be implemented using other techniques employing semiconductor gated technology.

Figure 10:
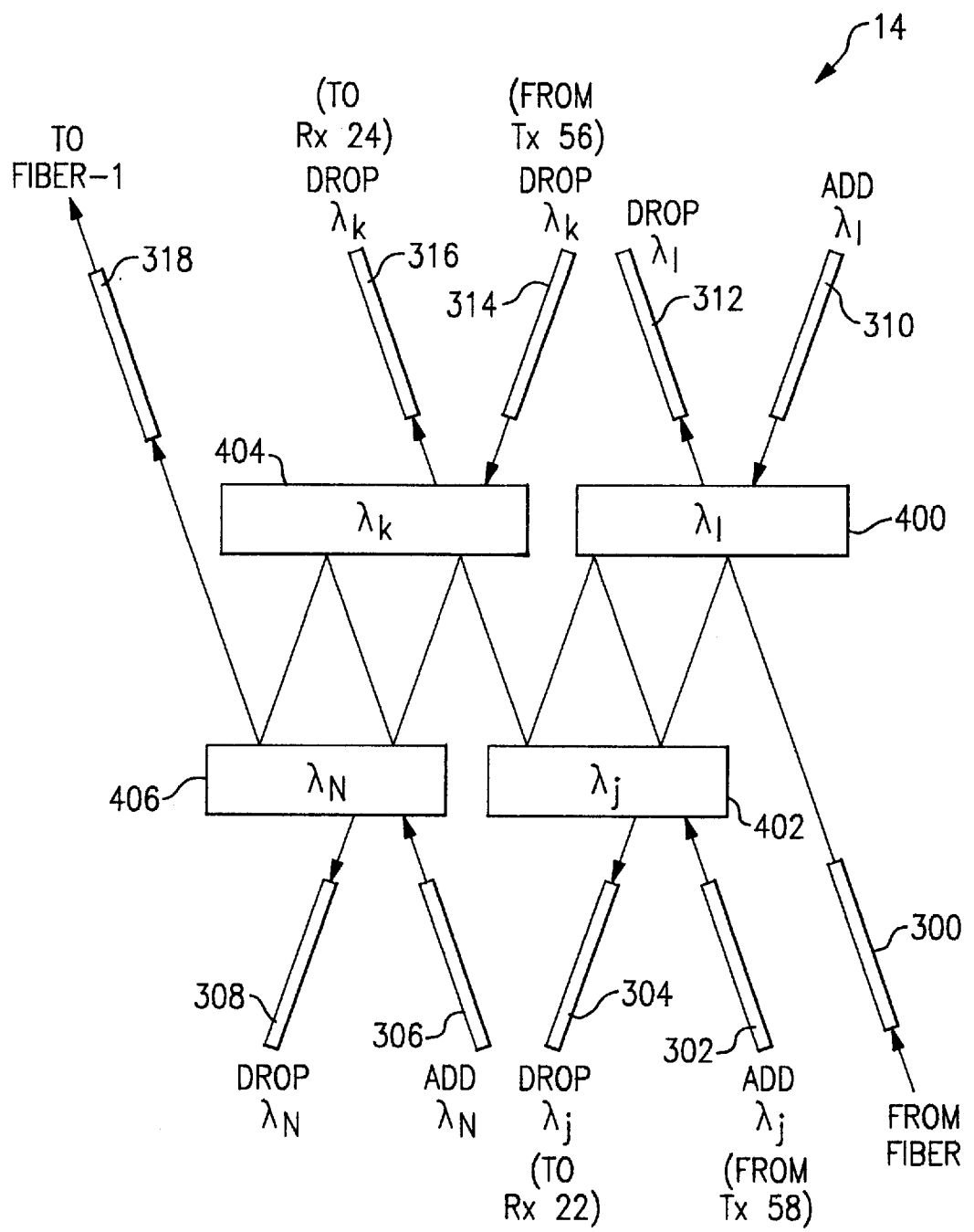
FIG. 10 is a block diagram of the wavelength add/drop multiplexers in accordance with an embodiment of the present invention.

As embodied herein and depicted in FIG. 10 a block diagram of a wavelength add/drop multiplexer in accordance with an embodiment of the present invention is disclosed. WADM 14 includes input collimator 300 and output collimator 318. Collimators 302, 306, 310, and 314 are add ports for wavelength channels $\lambda_j$, $\lambda_N$, $\lambda_1$, and $\lambda_k$, respectively.

Collimators 304, 308, 312, and 316 are used as drop ports for wavelength channels $\lambda_j$, $\lambda_N$, $\lambda_1$, and $\lambda_k$, respectively. WADM 14 also includes two-position movable wavelength channel selectors 400, 402, 404, and 406. The movable wavelength channel selectors are movable between a total reflection position and an add/drop position. The wavelength channel selectors are fabricated using an optical substrate that transmits all of the wavelengths present in the incident light signal. The total reflection portion is fabricated by depositing a highly reflective material such as gold over a portion of the substrate. The movable wavelength channel selector also has a second portion that includes a material tuned to a particular wavelength channel. Each wavelength channel selector is attached to a mechanical arm which is actuated between the total reflection position and the add/drop position.

For example, in the add/drop position wavelength channel selector 400 transmits wavelength $\lambda_1$. Thus, wavelength $\lambda_1$ is dropped from the incident light signal into drop port 312 and add-wavelength $\lambda_1$ is inserted into the light signal via port 310. In the total reflection position, all wavelength channels are reflected including wavelength $\lambda_1$. Thus, wavelength $\lambda_1$ is not dropped and a new add-wavelength $\lambda_1$ is not inserted into the light signal propagating in fiber 1. A similar analysis holds for wavelength channel selectors 402, 404, and 406 with respect to wavelengths $\lambda_j$, wavelength $\lambda_k$, and wavelength $\lambda_N$, respectively. One of ordinary skill in the art will recognize that the WADM depicted in FIG. 10 does not show other wavelength channels for clarity of illustration.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A protection switch in a node of a two-fiber optical channel shared protection ring, the node including a plurality of primary clients and a plurality of pre-emptible clients, each fiber in the two-fiber optical channel shared protection ring propagating at least one working wavelength channel dedicated to primary client traffic and at least one protection wavelength channel which may accommodate extra client traffic, the protection switch comprising:

an optical signal monitor coupled to the two-fiber optical channel shared protection ring, the optical signal monitor being operative to detect multi-wavelength channel failures and single wavelength channel failures in the two-fiber optical channel shared protection ring; and an electrical switching circuit coupled to the optical signal monitor, the electrical switching circuit being comprised of a plurality of modular switching fabrics, each modular switching fabric of the plurality of modular switching fabrics including a ring switch mode that is responsive to at least one of the multi-wavelength channel failures, and a span switch mode that is responsive to at least one of the single wavelength channel failures.

2. The protection switch of claim 1, wherein the ring switch is operative to switch a primary client's transmission signal from a working wavelength propagating on a first fiber of the two fibers to a protection wavelength propagating on a second fiber of the two fibers, switch the primary client's receive signal from a working wavelength propagating on the second fiber to a protection wavelength propagating on the first fiber, and pre-empt the extra client traffic.

3. The protection switch of claim 2, wherein the multi-wavelength channel failure is a cable cut severing the first fiber and the second fiber between a first node and a second node in the ring.

4. The protection switch of claim 1, wherein the span switch is operative to switch a primary client's transmission signal from a working wavelength propagating on the first fiber to a protection wavelength propagating on the first fiber, and switch a primary client's receive signal from a working wavelength propagating on the second fiber to a protection wavelength propagating on the second fiber.

5. The protection switch of claim 4, wherein the single wavelength channel failure includes an inoperative working wavelength channel.

6. The protection switch of claim 1, wherein each modular switching fabric includes a controller programmed to respond to the single wavelength channel failure and the multi-wavelength channel failure.

7. The protection switch of claim 1, wherein each modular switching fabric includes a plurality of 2×1 switches, and a plurality of 3×1 switches.

8. The protection switch of claim 7, wherein the plurality of 2×1 switches and the plurality of 3×1 switches are fabricated using gated semiconductor devices.

9. The protection switch of claim 7, wherein the plurality of 2×1 switches and the plurality of 3×1 switches are fabricated using data selectors.

10. The protection switch of claim 1, further comprising:

a first add multiplexer coupled to the first fiber and the electrical switching circuit;

a first drop multiplexer coupled to the first fiber and the electrical switching circuit;

a second add multiplexer coupled to the second fiber and the electrical switching circuit; and a second drop multiplexer coupled to the second fiber and the electrical switching circuit.

11. The protection switch of claim 10, wherein the first add multiplexer, the first drop multiplexer, the second add multiplexer, and the second drop multiplexer operate in a range of wavelengths including 1550 nm.

12. The protection switch of claim 10, wherein the first add multiplexer inserts the primary client's transmission onto the first fiber using a first fiber working wavelength channel.

13. The protection switch of claim 10, wherein the first add multiplexer inserts the primary client's transmission onto the first fiber using a first fiber protection wavelength channel in response to a multi-wavelength channel failure.

14. The protection switch of claim 10, wherein the second add multiplexer inserts the primary client's transmission onto the second fiber using a second fiber working wavelength channel.

15. The protection switch of claim 10, wherein the second add multiplexer inserts the primary client's transmission onto the second fiber using a second fiber protection wavelength channel in response to a single wavelength channel failure.

16. The protection switch of claim 10, wherein the first drop multiplexer drops a first fiber working wavelength channel from the first fiber to thereby route the primary client's receive signal to the electrical switching circuit.

17. The protection switch of claim 10, wherein the first drop multiplexer drops a first fiber protection wavelength channel from the first fiber to thereby route the primary client's receive signal to the electrical switching circuit in response to a multi-wavelengthchannel failure.

18. The protection switch of claim 10, wherein the second drop multiplexer drops a second fiber working wavelength channel from the second fiber to thereby route the primary client's receive signal to the electrical switching circuit.

19. The protection switch of claim 10, wherein the second drop multiplexer drops a second fiber protection wavelength channel from the second fiber to thereby route the primary client's receive signal to the electrical switching circuit in response to a single wavelength channel failure.

20. The protection switch of claim 10, further comprising:
a first optoelectric converter coupled to the first drop multiplexer and a modular switching fabric, the first optoelectric converter adapted to convert a first fiber working wavelength channel dropped from the first fiber into a first data signal readable by the modular switching fabric;
a second optoelectric converter coupled to the first drop multiplexer and the modular switching fabric, the second optoelectric converter adapted to convert a first fiber protection wavelength channel dropped from the first fiber into a second data signal readable by the modular switching fabric;
a third optoelectric converter coupled to the second drop multiplexer and the modular switching fabric, the third optoelectric converter adapted to convert a second fiber working wavelength channel dropped from the second fiber into a third data signal readable by the modular switching fabric; and
a fourth optoelectric converter coupled to the second drop multiplexer and the modular switching fabric, the fourth optoelectric converter adapted to convert a second fiber protection wavelength channel dropped from the second fiber into a fourth data signal readable by the modular switching fabric.

21. The protection switch of claim 20, wherein the modular switching fabric further comprises:
a first 3×1 switch having inputs coupled to the first optoelectric converter, second optoelectric converter, third optoelectric converter, and an output coupled to a first primary client receiver;
a first 2×1 switch having inputs coupled to the second optoelectric converter and an output coupled to a first extra client receiver;
a second 3×1 switch having inputs coupled to the second optoelectric converter, third optoelectric converter, fourth optoelectric converter, and an output coupled to a second primary client receiver;
a second 2×1 switch having inputs coupled to the third optoelectric converter and an output coupled to a second extra client receiver; and
a controller coupled to the first 3×1 switch, the second 3×1 switch, the first 2×1 switch, and the second 2×1 switch, the controller being operative to actuate the switches in response to the multi-wavelengthchannel failure, whereby the primary client's receive signal is received from a protection wavelength channel propagating on the first fiber instead of from a working wavelength channel propagating on the second fiber, and the extra client traffic is preempted.

22. The protection switch of claim 21, wherein the controller is operative to actuate the switches to receive the primary client's receive signal from a protection wavelength propagating on a fiber instead of a working wavelength channel on the fiber in response to the at least one fault condition being an inoperative working wavelength channel.

23. The protection switch of claim 10, further comprising:
a first electrooptic converter coupled to the first add multiplexer and a modular switching fabric, the first electrooptic converter adapted to convert a first data signal received from the modular switching fabric into a first-fiber wavelength channel to be added to first fiber traffic;
a second electrooptic converter coupled to the first add multiplexer and the modular switching fabric, the second electrooptic converter adapted to convert a second data signal received from the modular switching fabric a second first-fiber wavelength channel to be added to first fiber traffic;
a third electrooptic converter coupled to the second add multiplexer and the modular switching fabric, the third electrooptic converter adapted to convert a third data signal received from the modular switching fabric into a second-fiber wavelength channel to be added to second fiber traffic; and
a fourth electrooptic converter coupled to the second add multiplexer and the modular switching fabric, the fourth electrooptic converter adapted to convert a fourth data signal received from the modular switching fabric into a second second-fiber wavelength channel to be added to second fiber traffic.

24. The protection switch of claim 23, wherein the modular switching fabric further comprises:
a first 3×1 switch having an output coupled to the second electrooptic converter, and inputs coupled to a first primary client transmitter, a first extra client transmitter, and a second primary client transmitter;
a first 2×1 switch having an input coupled to the first extra client transmitter and an output connected to the first 3×1 switch;
a second 3×1 switch having an output coupled to the third electrooptic converter, and inputs coupled to a first primary client transmitter, a second extra client transmitter, and a second primary client transmitter;
a second 2×1 switch having an input coupled to the second extra client transmitter and an output connected to the second 3×1 switch; and
a controller coupled to the first 3×1 switch, the second 3×1 switch, the first 2×1 switch, and the second 2×1 switch, the controller being operative to actuate the switches in order to switch a primary client's transmission signal from a working wavelength channel propagating on a first fiber to a protection wavelength channel propagating on a second fiber in response to the multi-wavelengthchannel failure.

25. The protection switch of claim 24, wherein the controller is operative to switch a primary client's transmission signal from the working wavelength channel propagating on the first fiber to the protection wavelength channel propagating on the first fiber in response to a single wavelength channel failure.

26. The protection switch of claim 1, further comprising:
a plurality of electrooptic converters coupled to a modular switching fabric and a plurality of client receivers, the plurality of electrooptic converters being operative to convert working data signals and extra data signals transmitted by the electrical switch circuit into 1310 nm optical signals for reception by the plurality of client receivers; and
a plurality optoelectric converters coupled to the modular switching fabric and a plurality of client transmitters, the plurality optoelectric converters being operative to convert 1310 nm optical signals transmitted from the plurality of client transmitters into working data signals and protection data signals for use by the modular switching fabric.

27. The protection switch of claim 1, wherein each modular switching fabric includes an application specific integrated circuit (ASIC).

28. A modular switching fabric for use in a protection switch resident in a node of a two-fiber optical channel shared protection ring, each node including a plurality of primary clients and a plurality of pre-emptible clients, each fiber of the two fibers propagating at least one working wavelength channel dedicated to primary client traffic and at least one protection wavelength channel which may accommodate extra client traffic, the protection switch comprising:

a first 3×1 switch coupled to a first primary client receiver;

a first 2×1 switch coupled to a first extra client receiver;

a second 3×1 switch coupled to a second primary client receiver;

a second 2×1 switch coupled to a second extra client receiver; and a controller coupled to the first 3×1 switch, the second 3×1 switch, the first 2×1 switch, and the second 2×1 switch, the controller being operative to actuate the switches in order to receive the primary client's receive signal from a protection wavelength propagating on the first fiber instead of a working wavelength channel propagating on the second fiber, and pre-empt extra client traffic, in response to a multi-wavelengthchannel failure.

29. The two-fiber optical channel shared protection ring of claim 26, wherein the controller is operative to actuate the switches to receive the primary client's receive signal from a protection wavelength propagating on a fiber instead of a working wavelength channel on the fiber in response a single wavelength channel failure.

30. A two-fiber optical channel shared protection ring for bi-directional communications between a plurality of nodes, each node including a plurality of primary clients and a plurality of pre-emptible clients, each fiber of the two fibers propagating at least one working wavelength channel dedicated to primary client traffic and at least one protection wavelength channel which may accommodate extra client traffic, the protection switch comprising:

a first 3×1 switch having inputs coupled to a first primary client transmitter, a first extra client transmitter, and a second primary client transmitter;

a first 2×1 switch having an input coupled to the first extra client transmitter and an output connected to the first 3×1 switch;

a second 3×1 switch having inputs coupled to a first primary client transmitter, a second extra client transmitter, and a second primary client transmitter;

a second 2×1 switch having an input coupled to the second extra client transmitter and an output connected to the second 3×1 switch; and a controller coupled to the first 3×1 switch, the second 3×1 switch, the first 2×1 switch, and the second 2×1 switch, the controller being operative to actuate the switches in order to switch a primary client's transmission signal from a working wavelength propagating on a first fiber of the two fibers to a protection wavelength propagating on a second fiber of the two fibers in response to a multi-wavelength channel failure.

31. The protection switch of claim 30, wherein the controller is operative to switch a primary client's transmission signal from the working wavelength propagating on the first fiber to the protection wavelength propagating on the first fiber in response to a single wavelength channel failure.

32. A method for switching bi-directional traffic between a plurality of nodes in a two-fiber optical channel shared protection ring, each node including a plurality of primary clients and a plurality of pre-emptible clients, each fiber of the two fibers propagating at least one working wavelength channel dedicated to primary client traffic and at least one protection wavelength channel which may accommodate extra client traffic, the method comprising:

providing a protection switch in each node of the plurality of nodes, each protection switch being coupled to the two fibers, the plurality of primary clients, and the plurality of pre-emptible clients, wherein the protection switch includes a plurality of modular switching fabrics;

detecting a fault condition in the two-fiber optical channel shared protection ring;

actuating at least one of the modular switching fabrics in response to the step of detecting, whereby a primary client's transmission signal is switched from a working wavelength propagating on a first fiber of the two fibers to a protection wavelength propagating on a second fiber of the two fibers, switching the primary client's receive signal from a working wavelength propagating on the second fiber to a protection wavelength propagating on the first fiber, and preempting extra client traffic.

33. The method of claim 32, wherein the fault condition is a multi-wavelengthchannel failure.

34. The method of claim 32, wherein the step of actuating includes switching a primary client's transmission signal from the working wavelength propagating on the first fiber to the protection wavelength propagating on the first fiber, and switching the primary client's receive signal from a working wavelength propagating on the second fiber to a protection wavelength propagating on the second fiber.

35. The method of claim 34, wherein the fault is a single wavelength channel failure.

* * * * *

UNITED STATES PATENT AND TRADEMARK OFFICE
CERTIFICATE OF CORRECTION

PATENT NO. : 6,414,765 B1
DATED : July 2, 2002
INVENTOR(S) : Ming Li, Mark Soulliere and Richard Wagner It is certified that error appears in the above-identified patent and that said Letters Patent is hereby corrected as shown below:

Column 11
Line 47, "3x1 switch" should be -- 2x1 switch --

Column 12,
Line 4, "coupled to the first add" should be -- coupled to the first drop --
Line 16, "coupled to the second add" should be -- coupled to the second drop --

Signed and Sealed this

Twenty-sixth Day of November, 2002

Attest:

JAMES E. ROGAN
Attesting Officer     Director of the United States Patent and Trademark Office